Aug. 19, 1952     J. A. OSTERLIND     2,607,404
WELDING BURNER WITH DETACHABLE TIP
Filed June 6, 1949
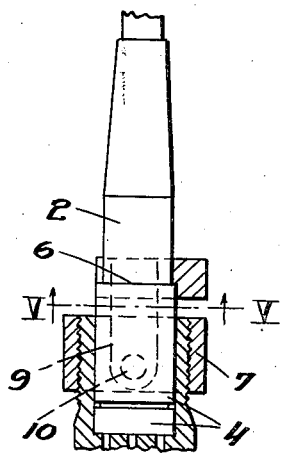
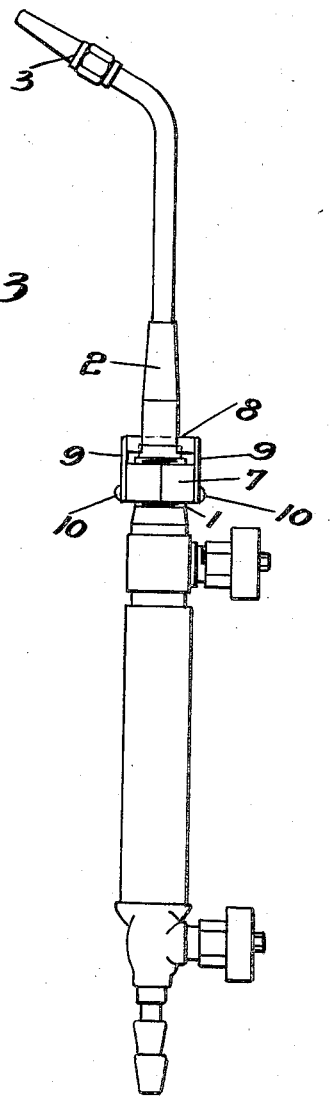
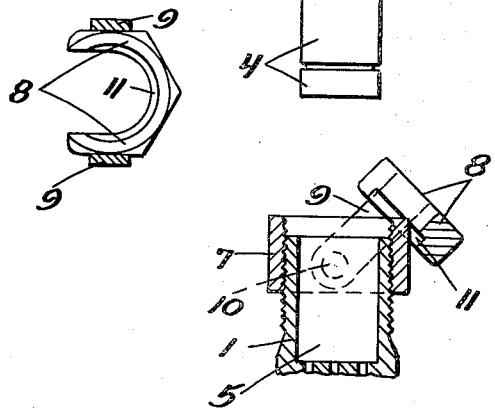

Patented Aug. 19, 1952

2,607,404

UNITED STATES PATENT OFFICE 2,607,404

WELDING BURNER WITH DETACHABLE TIP

Johan August Österlind, Malmo, Sweden

Application June 6, 1949, Serial No. 97,457
In Sweden May 21, 1948

1 Claim. (Cl. 158—27.4)

This invention relates to welding burners of the type used for welding and cutting by means of a flame of oxygen and acetylene or possibly any other combustible gas. In such welding burners the gas mixture flows from a burner handle to a burner nozzle through a so-called burner tip carrying said nozzle and having the form of e. g. a straight or angularly bent tube which is exchangeably inserted in the end of the burner handle, since different types of tips are necessary for different works. It is desirable that the exchange of the tip may be effected easily and rapidly.

The present invention has for its object to provide an arrangement which fulfils this desideratum in an especially high degree.

Further objects and advantages of the invention will appear from the following, reference being had to the accompanying drawing illustrating an embodiment of the invention.

In the drawing:

Fig. 1 shows a side view of a welding burner provided with the arrangement according to the invention.

Fig. 2 shows, on a larger scale and in axial section, the end of the burner handle which is to receive the burner tip.

Fig. 3 shows also on a larger scale a part of the burner, as seen from the side.

Fig. 4 shows an axial section through the end of the burner handle with the burner tip in position.

Fig. 5 shows a detail of the arrangement in section on line V—V in Fig. 4.

In the drawing, 1 designates the end of the burner handle and 2 the burner tip which is inserted with its end portion 4 remote from the burner nozzle 3 into an axial bore 5 provided in the handle end 1. In merging into the other part of the tip the end portion 4 thereof forms a shoulder 6 on the tip. To retain the tip in position in the handle end it was hitherto customary to use a sleeve nut passed over the tip and screwed on to the outwardly threaded handle end 1, said nut having an inner shoulder for co-operation with the shoulder 6 to tighten the tip against the bottom of the axial bore 5 by means of the sleeve nut. In exchanging the tip this sleeve nut had to be unscrewed from the handle end, whereafter the outer threads of the handle end were completely unprotected and therefore easily damaged. Besides, these threads were subjected to great wear due to the fact that the sleeve nut had to be completely unscrewed from the handle end every time that the tip had to be exchanged. Moreover, as a rule each tip had to have a sleeve nut of its own for retaining it in the burner handle.

According to the present invention the fastening of the exchangeable tip 2 in the handle end 1 of the burner is effected by means of a nut 7 screwed on to the handle end, and a U-shaped member 8 disposed outside the nut. Said U-shaped member 8 partly surrounds the tip 2 inserted in position in the axial bore 5 of the handle end 1 and is carried by a pair of arms 9 which are pivotally mounted on opposed sides of the nut 7 by means of pivots 10. The nut 7 has no inner shoulder for co-operation with the shoulder 6 on the tip and may always remain on the handle end, so that unscrewing of the nut from the handle end 1 in the exchange of the tip 2 is unnecessary. The U-shaped member 8 is adapted to co-operate with the shoulder 6 to tighten the tip against the bottom of the axial bore 5 by means of the nut 7, as is best seen from Fig. 4. When exchanging the tip, it is only necessary to loosen the tightened nut 7 a couple of turns, so that the U-shaped member 8 may be swung laterally to the position shown in Fig. 2, in which it releases the tip, thus enabling it to be removed and exchanged for a new one. To fasten the new tip the U-shaped member 8 is swung back into the position shown in Fig. 4, whereafter the nut 7 is tightened a couple of turns. When changing tip, the nut 7 need thus never be unscrewed completely, but only be loosened and tightened through a couple of turns, for which reason the exchange of tips may be effected very rapidly and the wear of the co-operating threads will be small. Finally, the outer threads on the handle end will always be protected by the nut 7 from having its edges chipped or otherwise damaged, when the burner handle is put aside after use. The demand for a special retaining nut for every tip is eliminated altogether. The U-shaped member 8 may preferably have a rabbet 11 in its underside normally fitting over the shoulder 6 in assembled relationship of the burner.

What I claim and desire to secure by Letters Patent is:

In a welding burner comprising a handle having an externally screw-threaded end and an axial bore therein, a tip exchangeably inserted in said bore, said tip having an external shoulder thereon, and a nut screwed on the externally screw threaded handle end for holding and tightening said tip in place in said bore, a U-shaped member, a pair of arms on said U-shaped member, said arms being pivotally connected to said nut on opposite sides thereof, said U-shaped member having in its underside a rabbet normally fitting over said shoulder on the tip in assembled relationship for the holding and tightening of the tip in place in the bore in the handle end by means of said nut, and said U-shaped member and said arms, after loosening of the nut, being swingable to carry said U-shaped member laterally out of engagement with said tip and the shoulder thereon for enabling a rapid and easy exchange of the tip without unscrewing the nut from the handle end.

JOHAN AUGUST ÖSTERLIND.

REFERENCES CITED

The following references are of record in the file of this patent:

UNITED STATES PATENTS

| Number | Name | Date |
|---|---|---|
| 964,238 | Goss | July 12, 1910 |
| 985,159 | Goodyear | Feb. 28, 1911 |
| 1,222,319 | Mueller | Apr. 10, 1917 |
| 1,828,135 | Fausek et al. | Oct. 20, 1931 |
| 1,875,361 | Thomas | Sept. 6, 1932 |
| 1,989,649 | Bucknam | Jan. 29, 1935 |
| 2,281,633 | Stitzer | May 5, 1942 |
| 2,494,744 | Messick | Jan. 17, 1950 |